(12) United States Patent
Hoerig et al.

(10) Patent No.: US 6,212,614 B1
(45) Date of Patent: Apr. 3, 2001

(54) LEGACY MIL-STD-1750A SOFTWARE EMULATOR ADDRESS TRANSLATION USING POWER PC MEMORY MANAGEMENT HARDWARE

(75) Inventors: Timothy R. Hoerig, Beavercreek; William J. Cannon, Centerville, both of OH (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/451,431

(22) Filed: Nov. 30, 1999

Related U.S. Application Data (63) Continuation-in-part of application No. 09/002,960, filed on Jan. 5, 1998, now Pat. No. 6,041,402.

(51) Int. Cl.[7] .................................................. G06F 12/06
(52) U.S. Cl. .......................................... 711/209; 711/202
(58) Field of Search .................................. 711/202, 206, 711/208, 209

(56) References Cited

U.S. PATENT DOCUMENTS

| | | | |
|---|---|---|---|
| 4,276,594 | * | 6/1981 | Morley .................................. 713/600 |
| 4,760,525 | * | 7/1988 | Webb ....................................... 712/2 |
| 5,079,737 | * | 1/1992 | Hackbarth ............................ 711/164 |
| 5,548,746 | * | 8/1996 | Carpenter ................................. 710/3 |
| 5,822,749 | * | 10/1998 | Agarwal ................................... 707/2 |
| 5,956,752 | * | 9/1999 | Mathews .............................. 711/204 |

* cited by examiner

*Primary Examiner*—Eric Coleman
(74) *Attorney, Agent, or Firm*—Michael S. Yatsko (57) ABSTRACT

A system and method for implementing the paging and protection attributes, such as block protection and access lock and key functions promulgated in MIL-STD-1750A. The present invention takes advantage of the PowerPC microprocessor architecture to implement the paging and protection attributes required by MIL-STD-1750A in hardware. Since the paging and the protection attributes are implemented in hardware, the system performance is greatly improved.

11 Claims, 13 Drawing Sheets

Mem Map 1750A

LEGACY MIL-STD-1750A SOFTWARE EMULATOR ADDRESS TRANSLATION USING POWER PC MEMORY MANAGEMENT HARDWARE

CROSS REFERENCE TO RELATED APPLICATIONS

This application is a continuation-in-part of commonly owned application Ser. No. 09/002,960, now U.S. Pat. No. 6,041,402, filed on Jan. 5, 1998. This application is also related to commonly owned copending patent application, filed on even date, entitled; "Concurrent Legacy and Native Code Execution Techniques"; by T. Hoerig, et al., application Ser. No. 09/451,156.

BACKGROUND OF THE INVENTION

1. Field of the Invention

The present invention relates to a memory management system and more particularly to memory management system which can be used with a software emulator which meets MIL-STD-1750A with respect to paging and protection attributes, such as block protection and access lock and key functions.

2. Description of the Prior Art

It is known that microprocessors are configured with different instruction set architectures (ISA). The ISA determines the instruction set for a particular microprocessor. Application programs are executed by the microprocessors normally written in relatively high level language, which is compiled into machine instructions compatible with the instruction set for the specific microprocessor. Microprocessors are increasingly being designed to execute instructions faster and faster. As such, systems incorporating such microprocessors are often upgraded to increase the speed of the system. Unfortunately, depending on the particular upgrade, often times the instruction set of the upgrade microprocessor is incompatible with the instruction set of the microprocessor to be replaced ("legacy microprocessor"). As such, in such applications, the existing application programs often need to be rewritten in new and modem computer languages with modem compilers. Unfortunately, such an undertaking can be quite cumbersome and expensive.

Due to the age and obsolescence of many existing avionic onboard computers, the reliability of such computers is rapidly declining while maintenance is becoming more difficult and costly to achieve. As such, it is sometimes required to replace outdated "legacy" microprocessors with newer technology "native" microprocessors. To work around instructions set incompatibilities, emulation systems (emulators) have been developed. Emulators are known which emulate the instructions set of the legacy microprocessor in order to enable the instructions of the legacy microprocessor to be "executed" by a different microprocessor. Both software and hardware based emulators are known. For example, various software emulators for the F-16 avionics integration support facility (AISF) common modular environment (COMET) are described in document no. F-16AISF-COMET-100 (EMULATORS-SWD-A, dated May 21, 1996). Hardware based emulators for military standard MIL-STD-1750A, are discussed in the document entitled Line Replaceable Unit Emulator Hardware Product Fabrication Specification, document no. SFF20702 dated Apr. 16, 1996.

Unfortunately, known software emulators have been known to be relatively inefficient. In particular, in such known software emulators, legacy instructions are fetched or the upgrade microprocessor which uses a look up table to interpret the legacy instruction. Since each legacy instruction must be interpreted, computer systems which incorporate cache memory are known to suffer from relatively high probability of cache misses which decreases the overall throughput of the system.

Another problem with such software emulators is the need to comply with MIL-STD-1750A with respect to memory management. As used herein MIL-STD-1750A refers to "Military Standard Sixteen Bit Computer Instruction Set Architecture", dated Jul. 2, 1980, hereby incorporated by reference. MIL-STD-1750A sets forth a virtual paging and protection scheme that maps sixteen (16) 64K word logical operand spaces and sixteen (16) 64K word logical instruction spaces into 1 M word of physical memory. Each 64K word logical space is controlled by sixteen (16) logical page registers which control the logical to physical mapping as well as the protection attributes, such as execute protect and write protect, as well as an access lock and key functions. Block protection is specified for physical memory in blocks of 1K word size. Block protection over-rides page register protection. In other words, if the block is write protected, it is write protected regardless of the write protection setting in the page registers.

To accurately model the protection attributes in a software emulator, each operand access and each instruction access require software to look up the current settings for the page register and determine the protection. If the attribute enables access, then the access is performed, otherwise a fault is generated. Such protection attributes are known to seriously degrade the performance of such software emulators. Thus, there is a need to efficiently implement paging and block protect, and lock and key functions which meet MIL-STD-1750A for a software emulator.

SUMMARY OF THE INVENTION

Briefly the present invention relates to a system and method for implementing the paging and protection attributes, such as block protection and access lock and key functions promulgated in MIL-STD-1750A. The present invention takes advantage of the PowerPC microprocessor architecture to implement the paging and protection attributes required by MIL-STD-1750A in hardware. Since the paging and the protection attributes are implemented in hardware, the system performance is greatly improved.

BRIEF DESCRIPTION OF THE DRAWING

These and other objects of the present invention will be readily understood with reference to the following specification and attached drawing, wherein.

DETAILED DESCRIPTION OF THE INVENTION

The present invention relates to a emulation system which meets MIL-STD-1750A. FIGS. 1–4 relate to a software emulation system and method for emulating legacy instructions of an outdated ("legacy") microprocessor with a new upgrade microprocessor with an incompatible instruction set FIGS. 5–9 relate to a method for implementing the paging and protection attributes, such as block protection and access lock and key functions features specified in MIL-STD-1750A.

DIRECT VECTORED LEGACY INSTRUCTION SET EMULATION

In applications in which a new upgrade "native" microprocessor replaces an outdated "legacy microprocessor with a different instruction set, software programs are written which emulate each of the legacy instructions using instructions of the upgrade microprocessor. In known emulation systems, the emulation software causes the legacy instruction to be fetched and interpreted by the new microprocessor by way of the lookup table. As discussed in more detail below, such methodology has a significant impact on the throughput of the system. In order to increase the throughput of the system, the legacy instructions are translated into direct vectors to software routines or emulation code for emulating the legacy instructions. As such, as will be discussed in more detail below, the probability of cache misses is greatly reduced which results in increased throughput of the system.

Figure 1:
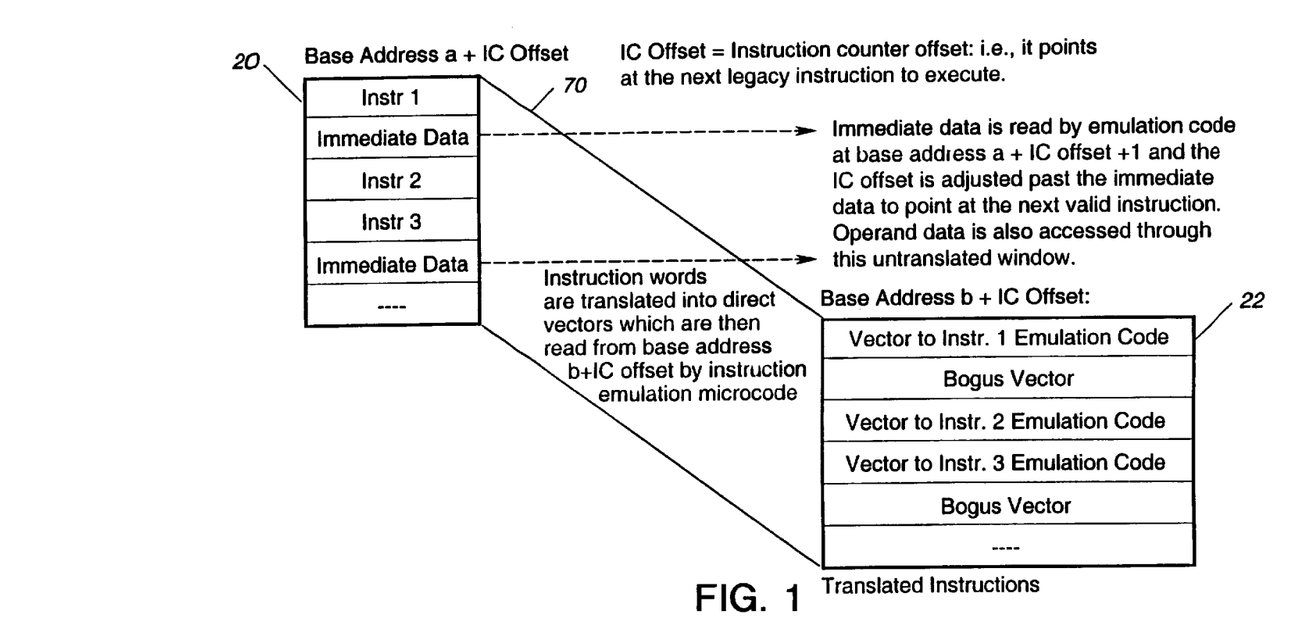
FIG. 1 is a block diagram illustrating the translation of the legacy instruction in accordance with the present invention.

Turning to FIG. 1, embedded software or code for a legacy microprocessor is generally identified with the reference numeral 20. Such code is normally stored in non-volatile read only memory (ROM). As shown, the ROM 20 includes legacy instructions, identified as INSTR 1, INSTR 2 and INSTR 3, etc. The ROM 20 also includes immediate data. The instructions INSTR 1, INSTR 2, INSTR 3, etc. plus the immediate data in the ROM 20, are located, for example, at a base address A within the memory space.

In accordance with an important aspect of the invention, each instruction (i.e. instruction INSTR 1, INSTR 2, INSTR 3, etc.) is translated to a direct vector to a software routine or emulation code for emulating the legacy instruction. For example, each legacy instruction is mapped or translated to another memory device 22, such as a ROM 22. The structure of the memory device 22 with respect to the instructions, is maintained the same as the ROM 20 but at a different base address B. In other words, instructions in the ROM 20 are located at a base address A plus an instruction counter (IC) offset which corresponds to the next legacy instruction to be executed. The instructions, INSTR1, INSTR 2, INSTR3, etc. are mapped to the ROM 22 at a different base address B but with the same IC offset.

The direct vectors in the ROM 22 can either be JUMP instructions to software routines for emulating the legacy instruction or address pointers. For example, the direct vectors can represent an offset pointer to an emulation microcode routine or a pointer to a table which contains a pointer to a microcode routine. Regardless, it is these vectors that are fetched by the emulation software rather than the legacy instructions.

The immediate data may be translated into bogus vectors in the ROM 22 which are not used by the emulation software. Rather, the emulation software in accordance with present invention may access the immediate data directly from the legacy code 20 by reading the data directly at the base address A from the ROM 20.

Figure 2:
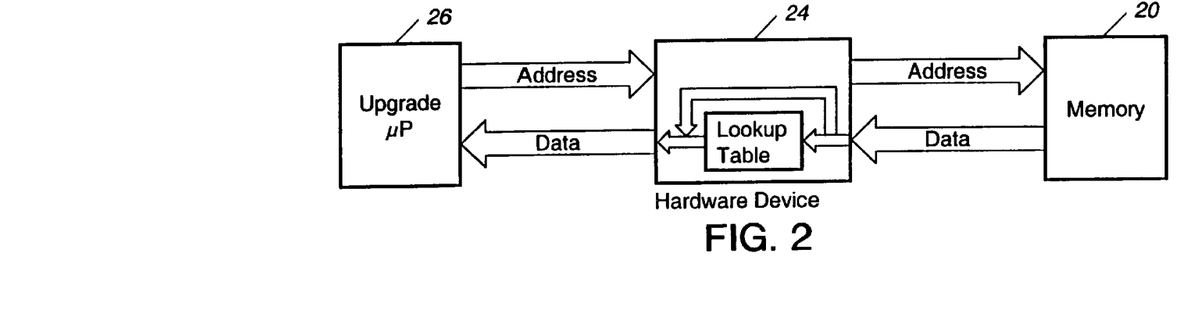
FIG. 2 is a block diagram illustrating one embodiment (in which vector translation is done by hardware) for translating the legacy instructions in accordance with the present invention.
Figure 3:
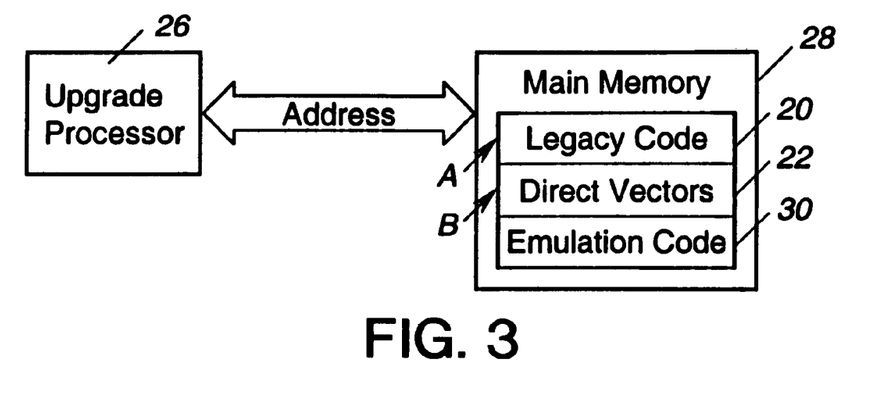
FIG. 3 is a block diagram illustrating the mapping of the legacy instructions to main memory.

Various methods are suitable for translating the legacy microcode. Both hardware and software methods for translating these instructions are suitable. FIG. 2 illustrates a hardware implementation in which a hardware device 24, such as a ROM containing a lookup table, is coupled to the data bus between an upgrade microprocessor 26 and the legacy microcode, i.e. ROM 20. The hardware device 24 is configured such that at any time an access to the legacy code is requested, i.e. base address B plus IC offset, the vector corresponding to the requested instruction is provided. Alternately, the decoder can be bypassed such that an access to the legacy code (i.e. base address A plus IC offset) will return the untranslated data. Thus, the upgrade processor can be directed to the associated emulation code routine by the fetched vector, or it can access immediate data directly from memory.

In an alternate embodiment of the invention, the legacy emulation code may be translated by software when the legacy memory is loaded into main memory or modified. In particular, a software program, for example, a portion of the initialization software, is used to load the legacy code, into the computer system main memory 28 (FIG. 3) (e.g. at base address A). In this implementation, after loading the legacy microcode, the direct vectors (i.e. ROM 22) are loaded into the main memory 28 at another location (e.g. base address B), allowing the emulation code in the upgrade processor to access either the translated 22 or untranslated 20 legacy memory sections. The vectors retrieved from the translated memory 22 are used to point to the individual software routines in the emulation code 30. With this embodiment of the invention, the translated 22 and untranslated 20 legacy memory sections need not be disjoint, they might be interleaved, such that each vector immediately follows or proceeds the untranslated instruction.

As mentioned above, the configuration of the method and system for emulating legacy instructions is adapted to improve the throughput of the system. More particularly, many known microprocessors include cache memories in order to improve the throughput of the system. Software fetched from the main memory, is copied into the cache memory, which is much quicker than main memory. Thus, instructions stored in the cache memory can be executed much quicker than those stored only in main memory. Such cache memories are normally formed from high speed static random access memory (SRAM) and are used to store copies of data in the main memory or newly stored data. Such cache memories operate on the principles that most programs execute instructions in sequence, and, due to loops, programs are likely to re-use recently fetched instructions. This principle is call locality. Thus, instead of fetching a single instruction at a time, a cache memory system looks ahead and fetches blocks of instructions in sequence and stores the instructions for quick access.

In operation, all data stored in a cache memory is stored with what is known as an address tag. The address tag indicates the physical addresses of the data in the main memory that is being stored in the cache. Whenever the microprocessor initiates a memory access, the address tags in the cache memory are first examined to determine if the particular data requested is already stored in the cache memory. When the data is found in the cache memory, this is known as a cache hit and data is immediately available to the microprocessor. If it is determined that the requested data is not in the cache memory, this condition is known as a cache miss. As a result of a cache miss, the requested data then must be retrieved from the main memory at a much slower rate.

Figure 4:
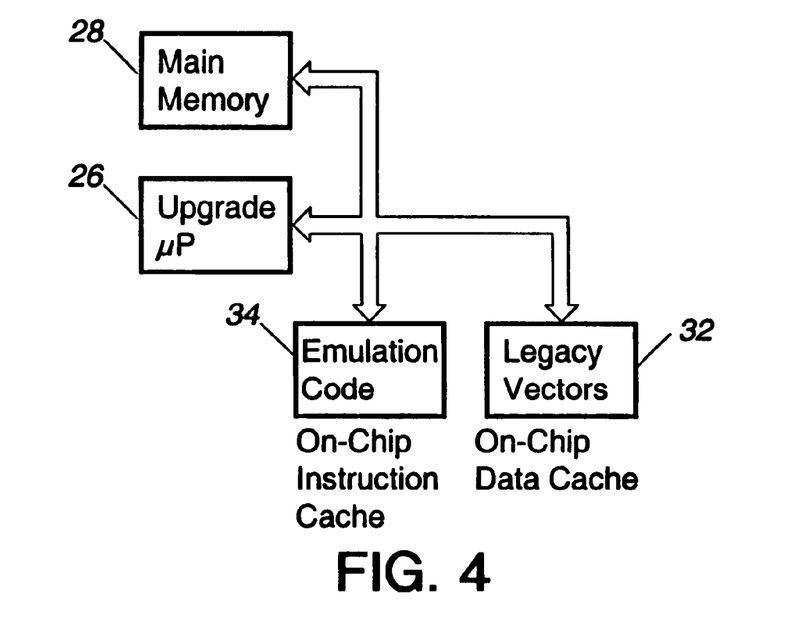
FIG. 4 is a block diagram of an upgrade microprocessor with cache memory for illustrating the operation of the cache system in accordance with the present invention.

FIG. 4 illustrates a typical configuration of a microprocessor with onboard cache memory. In previous known systems, the known emulation software fetched the legacy instructions themselves. The legacy instructions were then interpreted by way of lookup table. Since the cache memory is based on the premise that a sequence of data will be requested in sequential memory locations, the use of the lookup table is not particularly efficient in cache memory systems and results in a relatively high probability of cache misses. By utilizing direct vectors, and because of effects of the locality principle in the legacy code and corresponding direct vectors, the probability of cache misses is greatly reduced thereby increasing the overall throughput of the system. More particularly, referring to FIG. 4, a memory system in accordance with the present invention is illustrated. As shown, the system includes the upgrade microprocessor 26 which includes two onboard cache memories 32 and 34. One cache memory 32 is used for data, forming a data cache while the other cache memory 34 is used for instructions forming an instruction cache. The instruction cache 34 may be used almost exclusively for the emulation microcode. The data cache 32 may be used for the legacy code.

In operation, a group of eight vectors may be fetched from main memory upon a cache miss and stored in the data cache 32 as part of the cache line refill operation. Since legacy instructions normally proceed in sequential order, the subsequent 7 requests for instruction vectors will normally be resident in the data cache 30. If the next legacy instructions to be executed is non-sequential but is within the last one thousand instructions to executed, (i.e. local loops), there is a high probability that the vector will still be in the data cache 30. This invention has reduced the probability of cache misses and thus increased the throughput of the system.

LEGACY MIL-STD-1750A SOFTWARE

Emulator Address Translation

Microprocessors and software used in airborne applications are required to comply with MIL-STD-1750A. As discussed above, oftentimes outdated "legacy" microprocessors are replaced with newer "native" microprocessors. Since the native microprocessors are used with legacy software, software emulators have been developed to emulate the instructions of the legacy microprocessor. These native microprocessors as well as the software emulators need to be in compliance with the aforementioned standard. One aspect of the aforementioned standard relates to memory paging with associated protection attributes, such as block protection and access lock and key functions. In particular, MIL-STD-1750A applies to 16 bit computer systems and requires separate logical address space for instructions and operands. In particular, MIL-STD-1750A requires sixteen (16) 64K word logical operand or data spaces and sixteen (16) 64K word logical instruction spaces to be mapped into 1 M word of physical memory. Each 64K word logical space is controlled by sixteen (16) page registers which control the logical to physical mapping as well as the protection attributes, such as execute protect and write protect as well as an access lock and key. In addition, the MIL-STD-1750A specifies block protection for physical memory in blocks of 1K word sizes. As discussed above, meeting the requirements of MIL-STD-1750A can cause serious performance degradation in software emulators.

Figure 6:
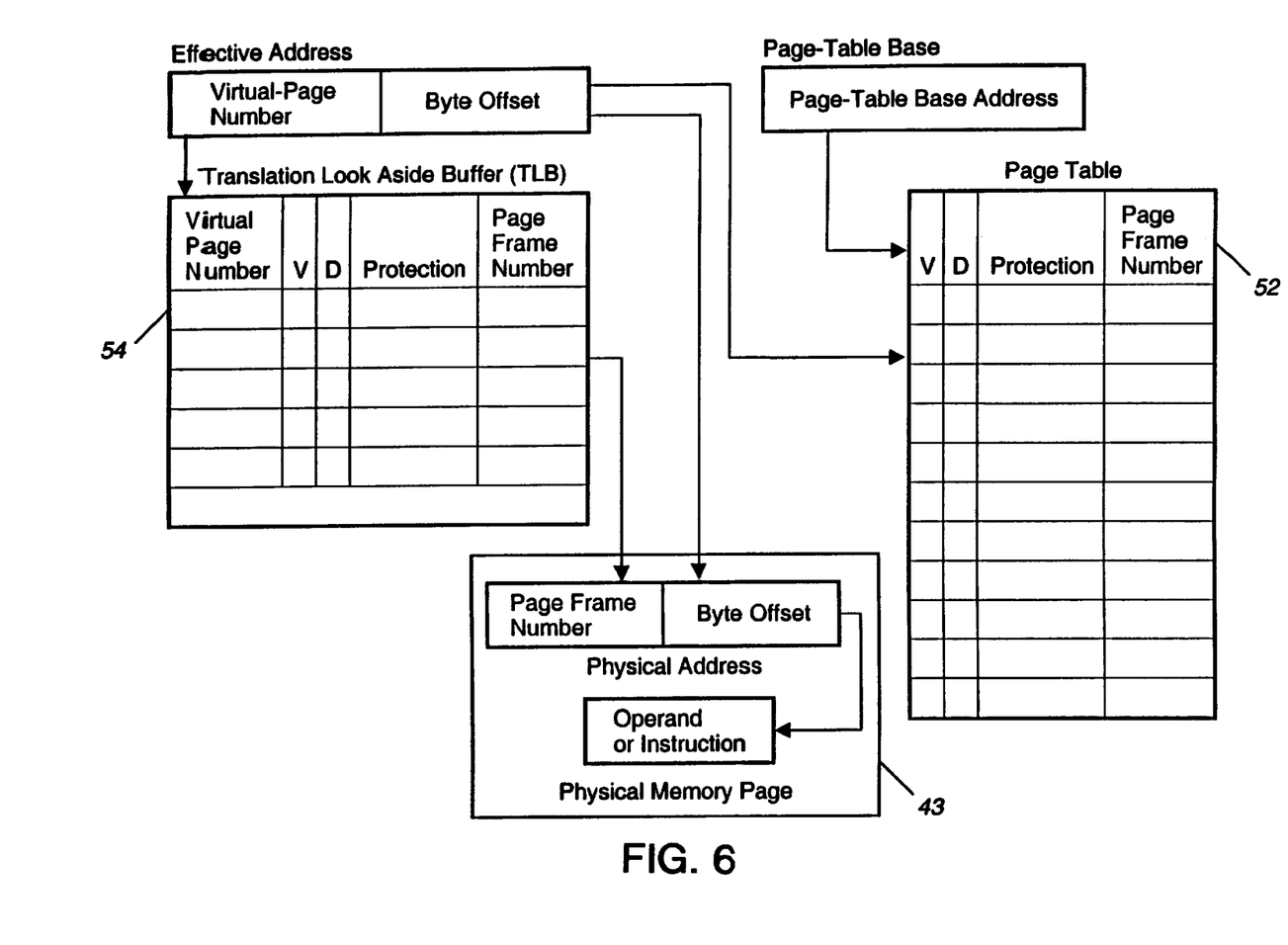
FIG. 6 is a diagram illustrating the virtual paging architecture of a PowerPC microprocessor.

The system in accordance with the present invention utilizes the virtual paging architecture, available on microprocessors constructed in accordance with the PowerPC architecture, as generally shown in FIG. 6, to implement the paging and protection attributes specified in MIL-STD-1750A. Since the paging and protection attributes are implemented in hardware, emulation of the paging with protection attributes in accordance with MIL-STD-1750A operates more efficiently than other known systems.

Figure 5:
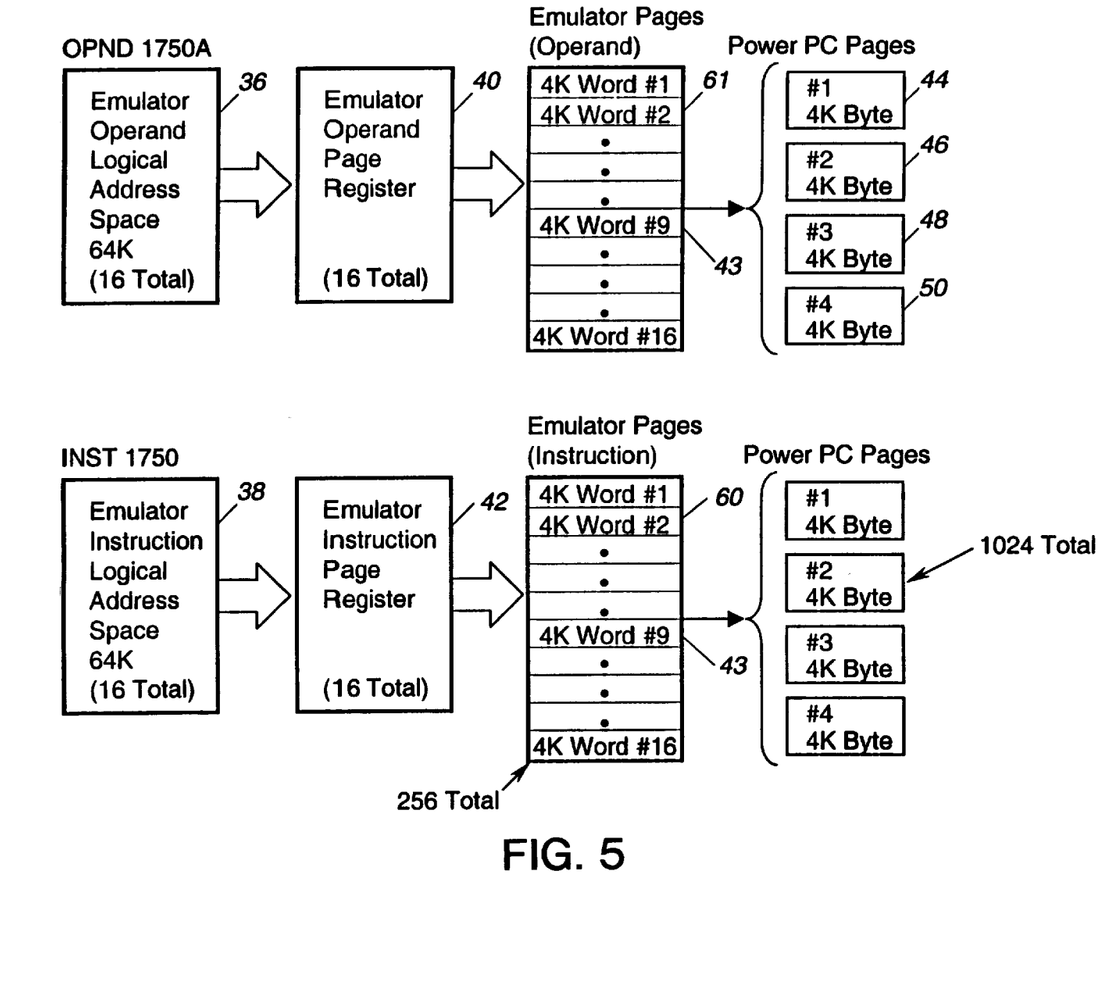
FIG. 5 is a diagram of the memory mapping in accordance with the present invention.

As discussed above, the MIL-STD-1750A specifies that the memory space be configured into sixteen (16) 64K word logical operand spaces (OPND 1750A) and (16) 64K word logical instruction spaces (INST 1750A). Referring to FIG. 5, only one of the 16 operand logical address spaces 36 and one instruction logical address spaces 38 is illustrated for convenience. Referring to the operand logical address space, each of the operand logical address spaces 36 is mapped by sixteen (16) hardware logical page registers 40 into sixteen (16) emulator logical address space pages; each page generally identified with the reference numeral 43 and configured as 4K word on 4K word boundaries. Thus, the sixteen (16) emulator operand logical address 64K word spaces 36 are mapped into 256 4 K word emulator pages 43 for a total of 1 M word of address space. The mapping of the emulator instruction logical address 38 is similar as illustrated in FIG. 5 and is mapped into the same 1 M word of address space.

In accordance with an important aspect of the invention, the paging requirements set forth in MIL-STD-1750A can easily be implemented by utilizing a microprocessor conforming to the PowerPC architecture. In order to take advantage of the PowerPC architecture with respect to paging as well as the protection attributes, the system in accordance with the present invention represents each word in the emulator pages 43 as 4 bytes to the Power PC environment. As such, this allows one (1) emulator operand page 43 to be mapped to four (4) PowerPC pages 44,46,48 and 50 of physical memory as shown in FIG. 5. Thus, each emulator operand 64K word logical address space 36 is mapped to sixteen (16) emulator logical 4K word address pages 43, which, in turn, are mapped to four (4) PowerPC pages; each power PC page being 4K bytes. The sixteen (16) emulator operand 64K word logical address spaces will thus map to 1024 PowerPC 4K byte pages 36. As such, one (1) Power PC page will map to a 1K word block of the emulator instruction logical address space 38. By so configuring the PowerPC microprocessor, one (1) PowerPC page (4K bytes) will map to a 1K word block of the emulator operand logical address space. Since the PowerPC architecture provides for block protection of each PowerPC page, which, in turn, is mapped to 1K word of emulator operand logical address space 36, block protection down to a granularity of 1K word as required by MIL-STD-1750 is satisfied.

Implementation of the virtual paging scheme by way of a microprocessor configured to the PowerPC architecture can be done rather conveniently and easily. Detailed information for programming a microprocessor conforming to the PowerPC architecture is set forth in "PowerPC" Microprocessor Family: The Programmers Reference Guide, document No. MPCPRG/D, dated October, 1995, available from Motorola, hereby incorporated by reference.

The virtual paging architecture of the PowerPC microprocessor is best understood with reference to FIG. 6 and as generally described in "Computer Architecture", by Robert J. Baron and Lee Higbie, published by Addison-Wesley Publishing Company, copyright 1992, pages 206–208, hereby incorporated by reference. In general, logical addresses are divided into two parts, a virtual page number and a word offset within a page. The division is done by partitioning the bits of the logical address, in this case, the logical addresses of the emulator operand and instruction pages 36 and 38. Normally, the higher order bits are used for the page number while the lower order bits represent the offset. In order to account for the translation between logical and physical address locations within the memory, the operating system of the microprocessor normally utilizes a page table 52 in main memory. Such a page table 52 normally includes control information for each memory page. An exemplary page table 52 is illustrated in FIG. 6 and includes a column for a validity bit (V), which indicates whether the page is in memory; a dirty bit (D) which indicates whether the program has modified the page; and a protection field which indicates which users may access the page and how (for example read only or read and write) and a page frame number for the page.

Each row in the page table 52 represents a 4K byte page of memory in the PowerPC architecture environment. As discussed above, since each page in the PowerPC architecture environment is used to represent 1K word of legacy memory, block protection in 1K word blocks is easily accomplished, since the PowerPC architecture provides for block protection for each PowerPC page. As such, the block protection at the 1K word level of granularity for the emulator logical address space as required by the MIL-STD-1750A is greatly simplified and implemented simply by the block protection provided by the PowerPC microprocessor architecture.

As will be discussed below, the PowerPC architecture also includes a translation look aside buffer (TLB) 54 (FIG. 6). The TLB 54 is an address translation cache which essentially has the same information as the page table 52 as generally shown in FIG. 6 to reduce accesses to the main memory and speed up the overall throughput of the system.

Figure 7:
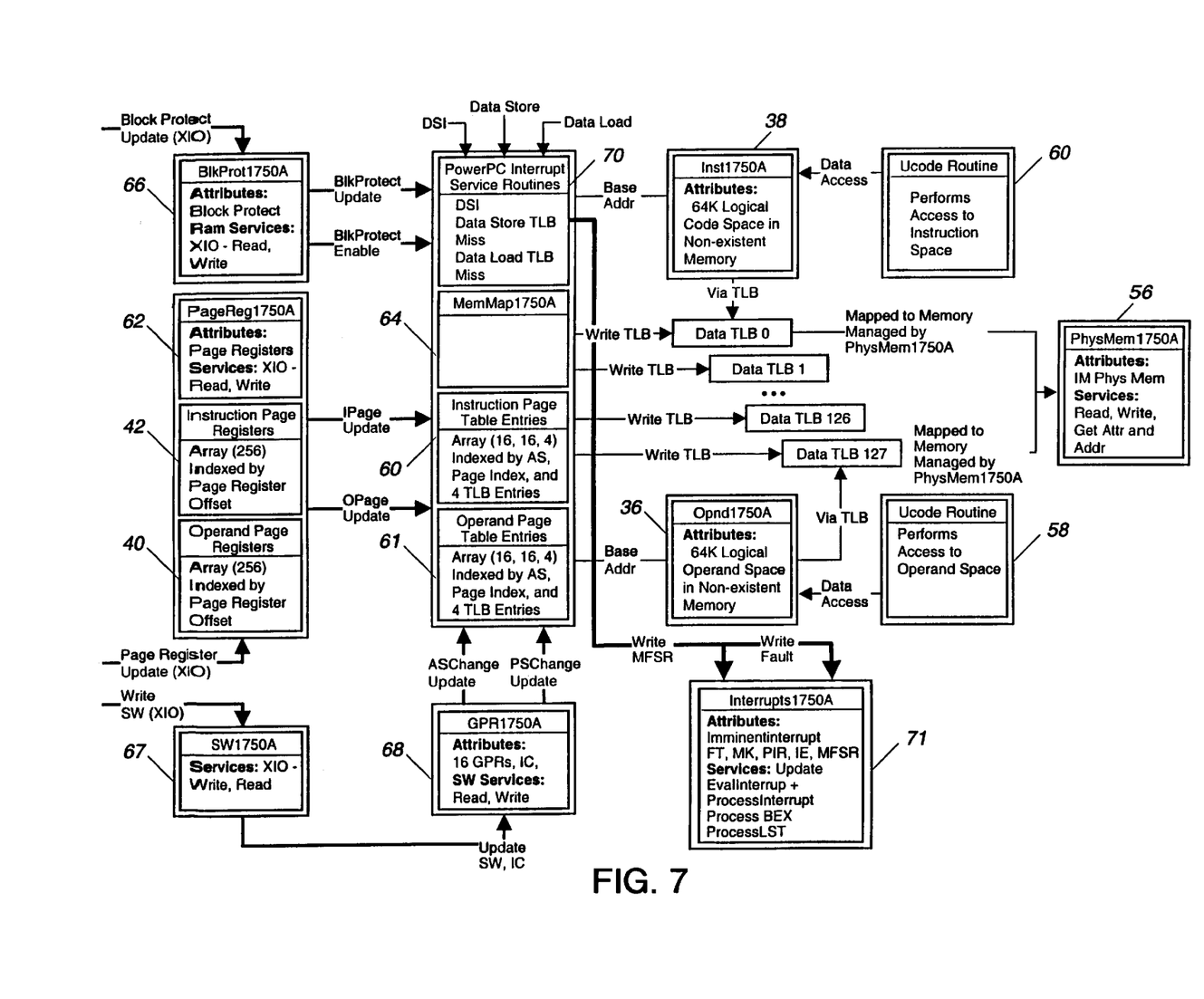
FIG. 7 is an exemplary block diagram of the system in accordance with the present invention.

An exemplary block diagram for implementing the virtual paging and block protection requirements specified by MIL-STD-1750A is illustrated in FIG. 7. As shown in FIG. 7, blocks which include the suffix -1750A are part of the software emulator.

Referring to FIG. 7, 1 M word of physical memory is represented by a PhyMem 1750A function block, identified with the reference numeral 56. In particular, the PhysMem 1750A block 56 represents 1 M word of physical memory which may have additional attributes, for example; NOMEMORY indicating physical memory not implemented; ROM indicating physical memory as read only; RAM indicating physical memory as read write and NON-CACHEABLE indicating that the physical memory is off-board and should not be cached by the PowerPC microprocessor. The PhysMem 1750A function block 56 manages the physical memory in 1K word blocks.

Figure 10:
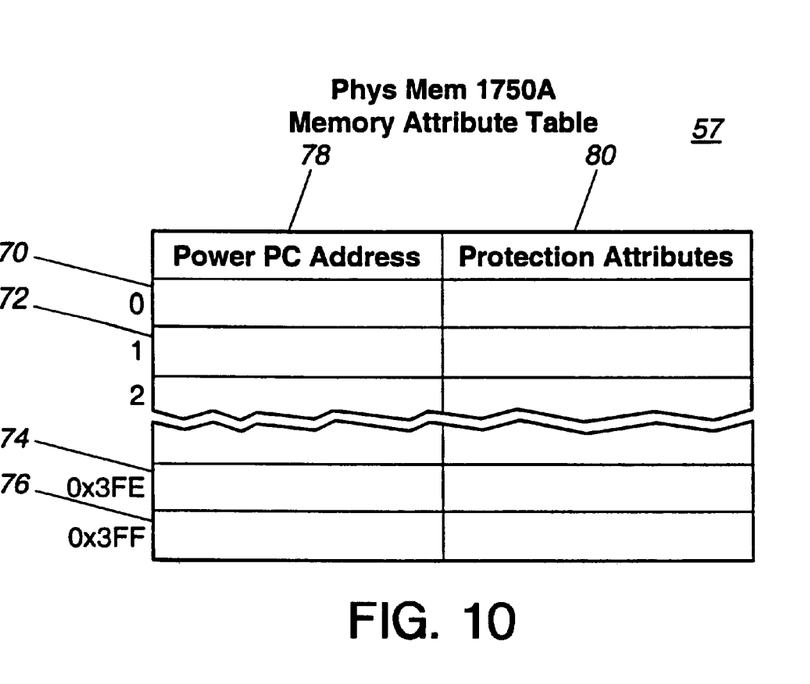
FIG. 10 is a block diagram of the PhysMem 1750A function block illustrated in FIG. 7.

A diagram of the memory attribute table 57 contained in the PhysMem 1750A function block 56 is illustrated in FIG. 10. The memory attribute table 57 is divided into 1024 entries, such as the entries 70, 72, 74 and 76. Each entry 70, 72, 74, and 76 consists of a PowerPC address field, generally identified with the reference numeral 78, and a protection attribute field 80. As discussed above, 4K bytes in the PowerPC address field 78 are mapped into 1K words in order to provide protection attributes down to a 1K word block level. Thus, each entry in the PowerPC address field corresponds to 4K bytes. As discussed above, by mapping each word in the emulator environment to 4 bytes in the PowerPC environment, protection can be provided down to the 1K word level in order to comply with MIL-STD-1750A As discussed above, the logical address space is divided up into (16) operand logical address spaces 36 and sixteen (16) instruction logical address spaces 38. These operand logical address spaces 36 and the instruction logical address spaces 38 are each formed from sixteen (16) 64K word logical address spaces to provide 1 M word logical address space for use for operands and instructions. The sixteen (16) logical operand spaces 36 and the sixteen (16) instruction spaces 38 are presented as windows in the PowerPC memory space. All accesses to the operand 36 and instruction spaces 38 by the software emulator are by way of micro code routines, identified with the reference numerals 58 and 60 respectively. As discussed above, each of the sixteen (16) 64K word operand logical address spaces 36 and instruction logical address spaces 38 are mapped by logical page registers 40 and 42, discussed above; each hardware register 40, 42 mapping a 64K word address space to sixteen (16) 4K word pages 43 on 4K word boundaries as generally shown in FIG. 5.

Figure 8:
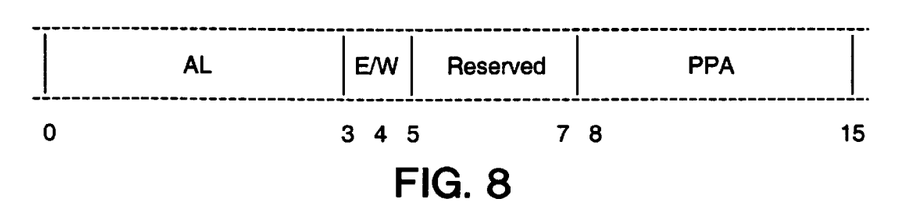
FIG. 8 is a bit map of the word format used in logical page registers in accordance with MIL-STD-1750A.

A bit map of the word format for the logical page registers 40, 42 in accordance with MIL-STD-1750 is illustrated in FIG. 8. As shown, the field AL (bits 0–3) relates to an optional access lock and key feature. If the access lock and key feature is not used, bits 0–3 are reset to zero. If the access lock and key feature is used, bits 0–3 define the access lock code for the associated page register, used with the access key codes, discussed below, to determine access permission. Permissible values of the access lock codes and access key codes are provided in Table VII of the MIL-STD-1750A. Bit 4 is a dual functional bit; the function of which is determined by whether it is used with an instruction page register or an operand page register. For instruction page registers, bit 4 is defined as an E bit and determines the criteria for reading for instruction fetches. When E=1, any attempted instruction read designating the page register is denied access and a fault is generated. For operand page registers, bit 4 is defined as a W bit and used to determine the criteria for permitting write references to an operand page register. When W=1, attempted writes to the associated page register are not permitted and a fault is generated. Bits 5–7 are reserved and are all set to 0. The PPA filed (bits 8–15) is used to define the physical page address.

The Power PC architecture includes a page table, such as the page table 52 illustrated in FIG. 6, for mapping the logical address space to physical address space. More specifically, an instruction page table 60 is provided to map the emulator instruction logical address space 38 to physical memory. Similarly, a Power PC operand page table 61 is used for mapping the operand logical address space 36 to physical memory. The logical addresses in the operand logical address space 36 and the instruction logical address space 38 are partitioned as shown in FIG. 6 with the higher order bits in the logical address space corresponding to page frame numbers in the page table 52 and the lower order bits representing the byte offset for the address of the operand or instruction within that particular memory page 43. Such page tables are normally maintained in main memory. In order to speed up memory accesses, the PowerPC architecture also keeps an internal cache of the most recently used page table entries, called a translation look aside buffer (TLB). In particular, whenever the PowerPC microprocessor performs a memory access, it compares the logical address of the access against entries in the TLB 54 and if it finds a match it uses the physical address in the TLB 54 to perform the access. If the required logical address is not in the TLB 54, the PowerPC operating system searches the page table 52 looking for a match. If a match is found it is loaded into the TLB 54 and the access is completed. If the required entry is not found in a page table 52, a page fault is then generated.

Referring to FIG. 7, all updates to the software emulator page registers 40 and 42 are through specialized input/output instructions (XIO's) that map one XIO location to one page register. These XIO's are intercepted by a PageReg 1750A function block 62 and passes them to a MemMap 1750A function block 64.

Figure 11:
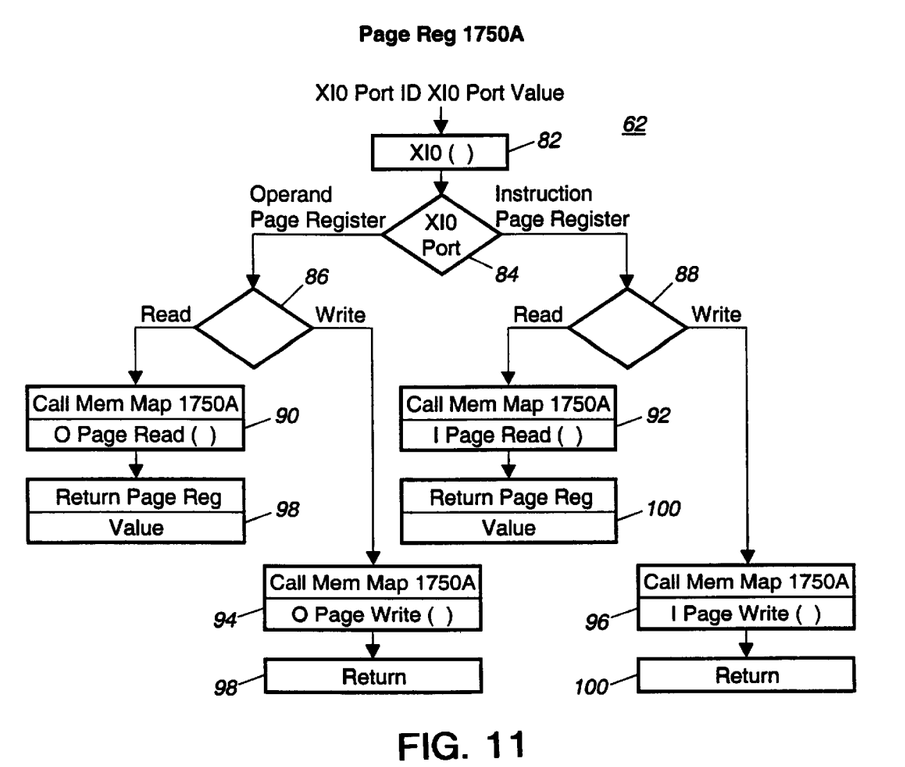
FIG. 11 is a filter for the PageReg 1750A function block illustrated in FIG. 11.

A flow chart for the PageReg 1750A function block 62 is illustrated in FIG. 11. As discussed above, the PageReg 1750A function block 62 intercepts the XIO's in step 82 and determines in step 84 whether the XIO's are for an operand or instruction page register by examining the port address of the XIO. As discussed above, the MIL-STD 1750A requires separate logical operand and logical instruction spaces. Once the system determines whether the XIO is for an operand or instruction page register, the system then determines in step 86 or 88 whether the XIO is a read or write. After determining whether the XIO is an operand or an instruction page register access and whether it is a read or write access of that page register, the system calls the MemMap 1750A function block 64, as indicated in steps 90, 92, 94 and 96. As will be discussed in more detail below, the MemMap 1750A function block 64 merely returns the page register value in steps 98 and 100 for read operations. For write operations, as will be discussed in more detail below, the PowerPC page tables are manipulated and the protection attributes are calculated and returned in steps 98 and 100.

Referring to FIG. 7, when a data access is performed by the software emulator microcode (Ucode) routine 58 or 60 to the operand or instruction logical address space 36 or 38, the PowerPC TLB 54 (FIG. 6) is searched to determine if it contains an entry with the virtual page number of the PowerPC effective address of the operand or instruction data access 36 or 38. If the TLB 54 does contain an entry with the virtual page number of the access, the PowerPC effective address is automatically translated to a corresponding PowerPC physical address according to FIG. 6 and the protection attributes of that entry are checked. If no entry in the TLB 54 contains the virtual page number of the access, the MemMap 1750A function block 64 updates the PowerPC page tables with the required synthesized page table entries and restarts the PowerPC instruction. If the protection attribute check indicates that the access being performed fails to meet the page table entry protection requirements, a PowerPC protection fault is generated. The MemMap 1750A function block 64 intercepts the PowerPC protection faults resulting from the attempted PowerPC access that did not meet the page table entry protection requirements. If the logical address of the fault is associated with an operand or instruction in the logical address spaces 36 or 38, an exception is generated and passed back to the software emulator.

Figure 12A:
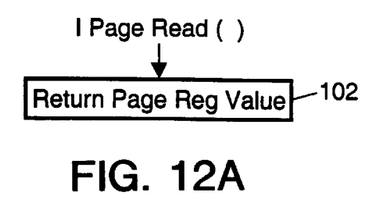
FIGS. 12A–12D are flowcharts representative of the MemMap 1750A function block illustrated in FIG. 7.
Figure 12B:
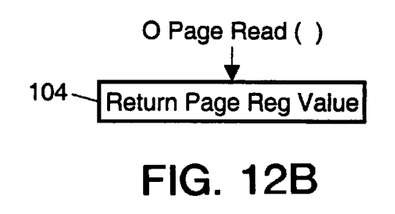

A flow chart for the MemMap 1750A function block 64 is illustrated in FIGS. 12A–12D. As mentioned above, the PageReg 1750A function block 64 determines whether the XIO is for an instruction or an operand page register and whether the XIO is a write or read operation. For instruction and operand read operations, as illustrated in FIGS. 12A and 12B, the page register value is returned as indicated in steps 102 and 104. As discussed above, the PowerPC tables include the protection attributes for each entry in the memory attribute table 57. As such, the protection attributes are returned in steps 102 and 104.

Figure 12C:
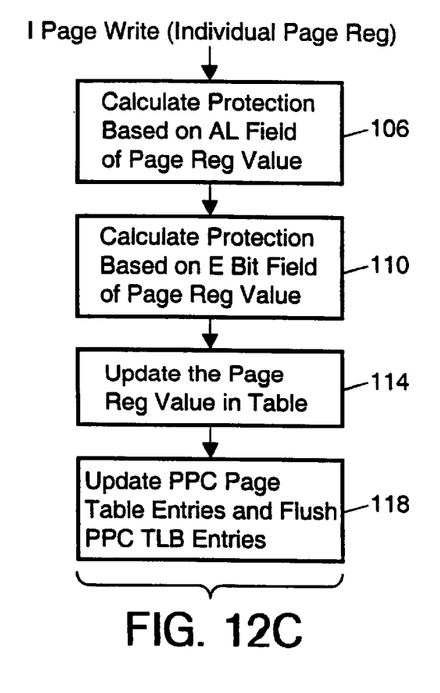
Figure 12D:
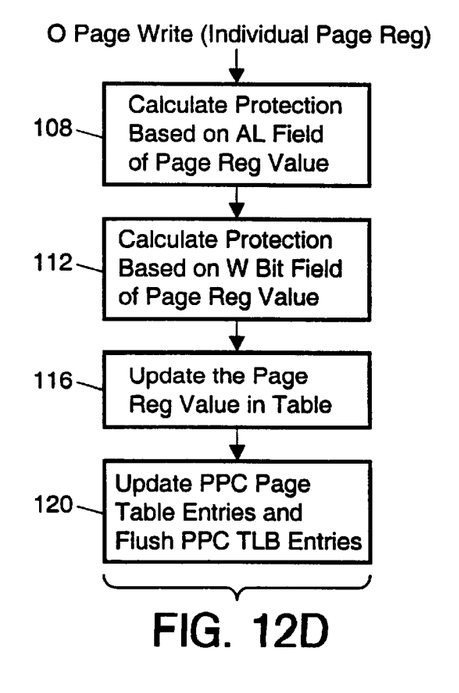

For instruction and operand page register write operations, the PowerPC page tables are manipulated and the protection attributes are calculated as indicated in FIGS. 12C and 12D. In particular referring to FIGS. 12C and 12D, for both instruction and operand page register write operations, the protection attributes are calculated in steps 106 and 108, depending on the value in the AL field (FIG. 8) of the logical page register 40 or 42. As discussed above, the AL field relates to an optional access lock and key feature. If the access lock and key feature is not used, this field is reset to zero. Subsequently, in steps 110 and 112 the E/W field from the page register 40 or 42 is read and the protection is calculated based in the value of the E/W field. As discussed above, the instruction page registers define an E bit which determines the criteria for reading instruction fetches. For operand page registers, this bit is defined as a W bit and is used to determine the criteria for permitting writes to an operand page register. Subsequently, in steps 114, 116, 118 and 120 after the protection is determined based on the AL field and E/W field, the PowerPC page table entries are updated. In addition, the TLB 54 entries are flushed.

Block protection XIO's are intercepted by a BlkProt 1750A function block 66 and passed to the MemMap 1750A function block 64. All updates to the software emulator block protects occur through the specialized XIO's that map one XIO location to sixteen (16) block protect entries (1 bit per block). These block protection XIO's are passed to the Power PC page table 52 (FIG. 6) to specify write protection for each physical block. As discussed above, the Power PC architecture provides for write protection for each Power PC page. Since one Power PC 4K byte page corresponds to 1K word of logical address space, block protection is provided down to 1K word granularity level as required by MIL-STD-1750A.

Figure 13A:
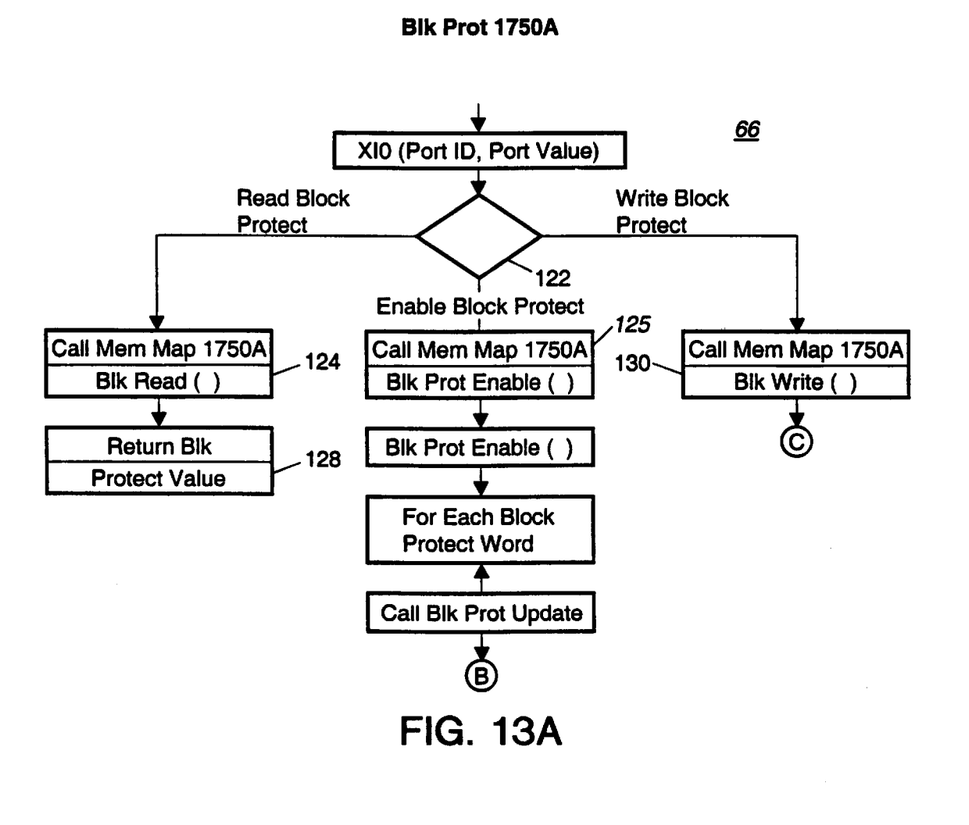
FIG. 13A is a block diagram for BlkProt 1750A function block illustrated in FIG. 7.
Figure 13B:
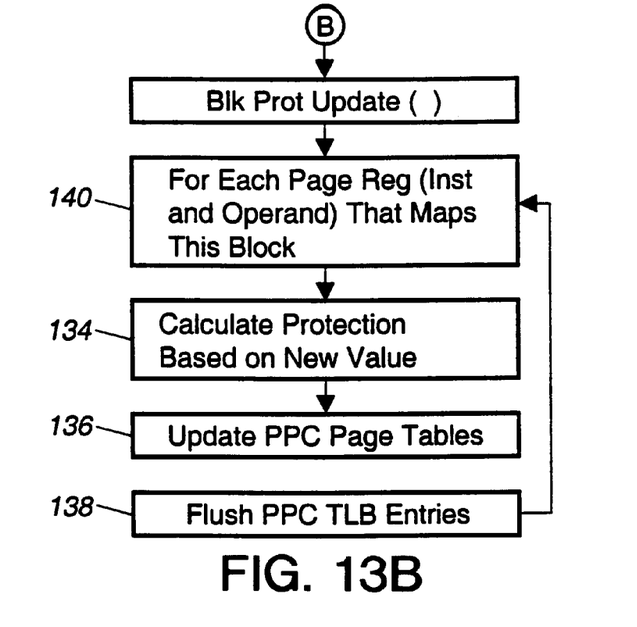
FIG. 13B is a block diagram for BlkProt Update function in accordance with the present invention.
Figure 13C:
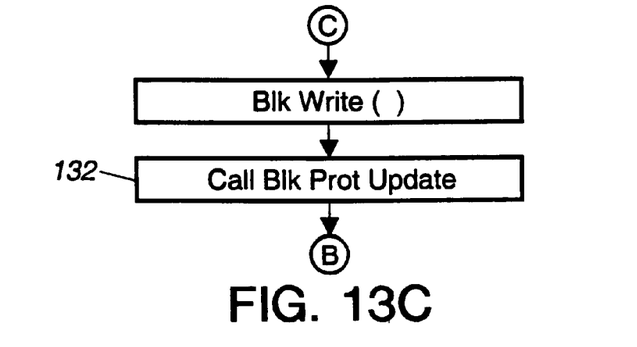
FIG. 13C is a block diagram for a Blk Write function in accordance with the present invention.
Figure 13D:
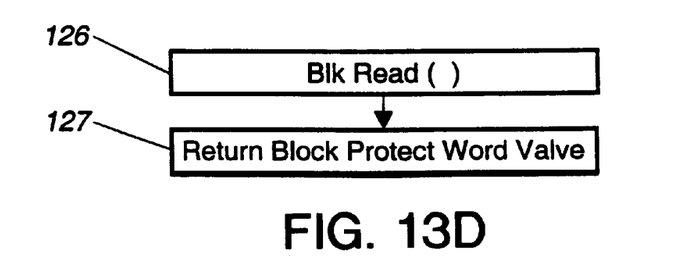
FIG. 13D is a block diagram of a Blk Read function in accordance with the present invention.

A flow chart for the BlkProt 1750A function block 66 is illustrated in FIGS. 13A–13D. Referring to FIG. 13A, initially the system determines whether the XIO is a read operation or a write operation or an enable function for the enabling the block protect feature in step 122. In steps 124, 125 and 130, the system calls the MemMap 1750A function block 64. In particular, for read operations the system calls MemMap 1750A and executes a BlkRead operation in step 126 as illustrated in FIG. 13D. As shown in FIG. 13D, the result of a BlkRead operation is a return of the block protection value in step 127, which is subsequently returned in step 128 (FIG. 13A) to complete the XIO read operation. For write operations, the system MemMap 1750A executes a BlkWrite operation in step 130. As shown in FIG. 13C, the BlkWrite operation makes a call to a BlkProt Update function as indicated in FIG. 13B in step 132. The BlkProt Update function calculates the value of the protection attribute based on the new value in step 134 for each page register entry that maps into the particular block. In step 136, the PowerPC pages are updated. In step 138 the PowerPC affected TLB entries are flushed.

The selection of the currently active set of sixteen (16) instruction and sixteen (16) operand page registers 42 and 40 is controlled by the value of the AS field of the 1750A status word (SW) emulated in the GPR1750A function block 68, as set forth in MIL-STD-1750A. All explicit program reads and writes of the SW are made through special XIOs which call the SW1750A function block 67.

Figure 9:
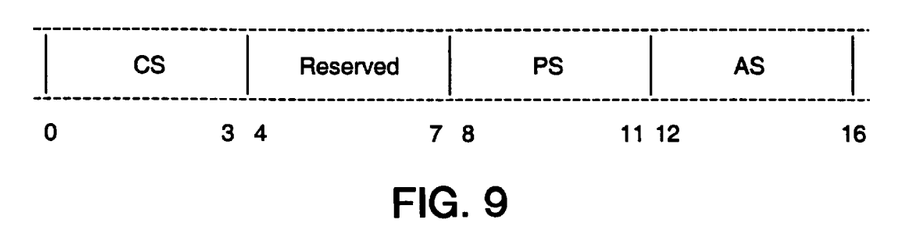
FIG. 9 is a bit map of a status word register in accordance with MIL-STD-1750A.

A bit map for the status word register is illustrated in FIG. 9 as specified in MIL-STD-1750A. The status word register is a 16 bit register and includes a condition status (CS) field (bits 0–3), defined in the MIL-STD-1750A. Bits 4–7 of the status word register are reserved. Bits 8–11 relate to a processor state (PS) field. This field defines the access key for use with the access lock and key protection attribute. This PS field defines the memory access key code for all instruction and operand references to memory. The PS field also determines the criteria for execution of privileged instructions. When PS=0, privileged instructions are allowed to be executed. When PS≠0, privileged instructions are aborted and a fault is generated. Bits 12–15 relate to an address state (AS) field. The AS field essentially defines the particular one of 16 logical address spaces 36 or 38 that is requesting access. The access key codes are read by the Power PC and used to calculate the protection for the protection field in the page table 52 (FIG. 6).

Figure 15A:
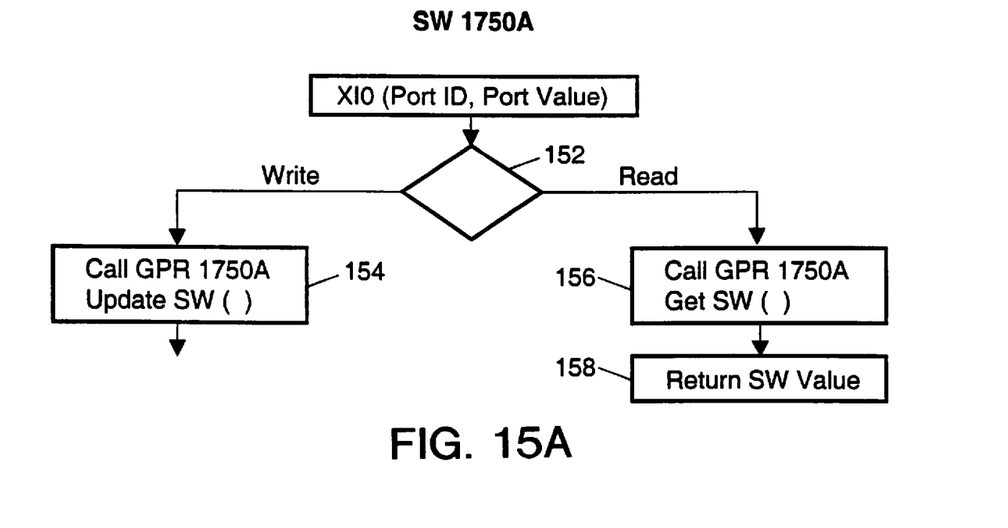
FIG. 15A is a block diagram of a SW 1750A function block illustrated in FIG. 7.

A block diagram for the SW 1750A function block 67 is illustrated in FIG. 15A. As shown, the system receives XIO's and determines in step 152 whether the XIO is a write or a read operation. For write operations, the system calls the function blocks GPR 1750A in step 154 and executes an update SW instruction as discussed below. For read operations the system also calls the function block GPR 1750A in step 156 and executes a Get SW function and returns a status word value in step 158. The GetSW function simply returns the current status word.

Figure 14A:
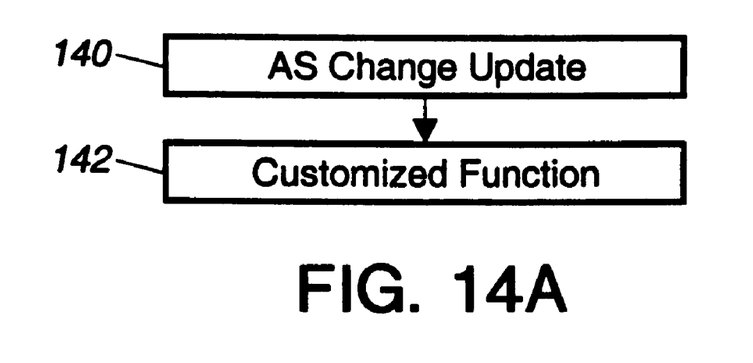
FIG. 14A is a block diagram of an ASchange Update function in accordance with the present invention.
Figure 14B:
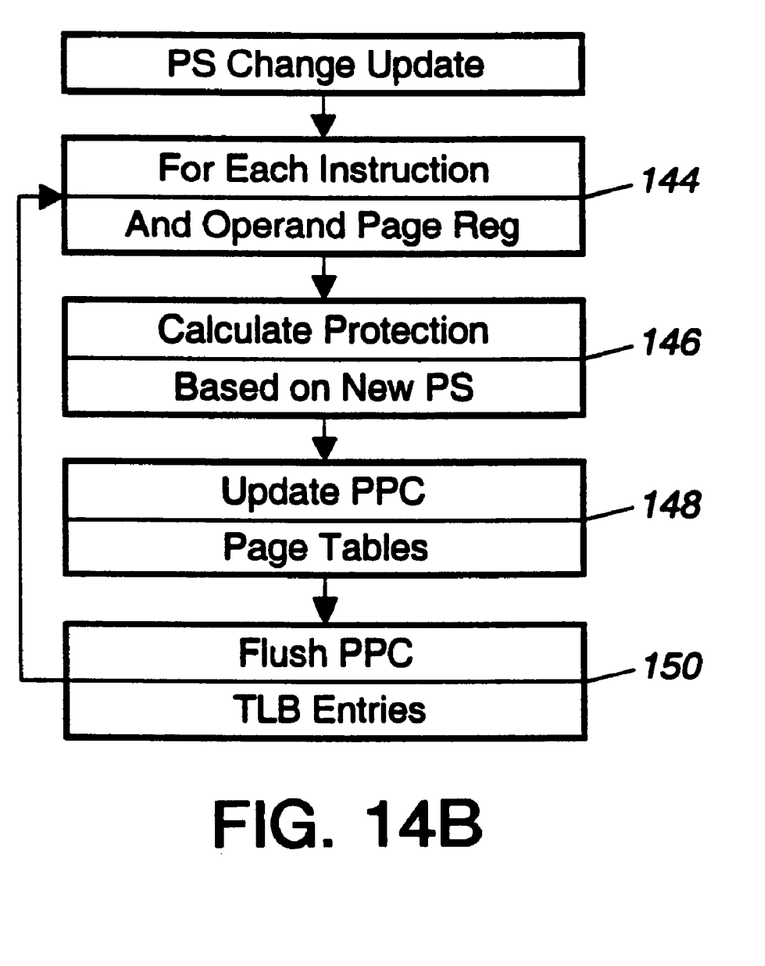
FIG. 14B is a block diagram for a PSchange Update function in accordance with the present invention.
Figure 15B:
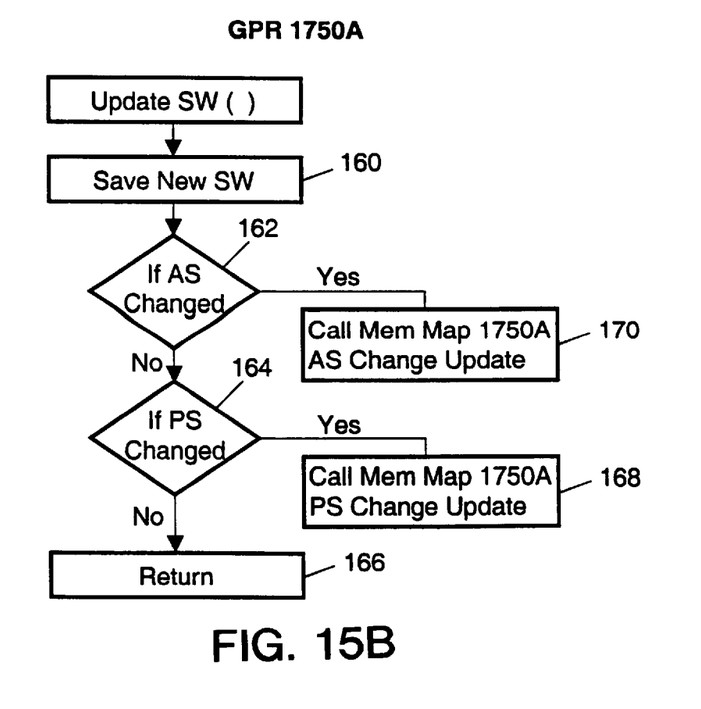
FIG. 15B is a block diagram of an Update SW function in accordance with the present invention.

FIG. 15B is a simplified flow chart for an Update SW instruction. In response to a request to write a new status word, the new status word is saved in step 160. In step 162, the system determines whether the address state AS field has changed in the page registers 40, 42. If not, the system proceeds to step 164 and determines whether the processor state PS field has changed. If not, the system returns in step 166. If the PS field has changed, the system calls the function block MemMap 1750A in step 168 and executes a call to the PS change update, illustrated in FIG. 14B, in step 168. If the AS field has changed as determined in step 162, the system makes a call to the function block MemMap 1750A in step 170 and executes an AS change update as indicated in FIG. 14A.

Flow charts for updating the AS and PS fields are illustrated in FIG. 14A and FIG. 14B. Updates to the AS field are indicated with the reference numeral 140. The changes to the AS field can be used for any number of customized functions as indicated by block 142.

Changes to the PS field are indicated in FIG. 14B. As shown, for each instruction and operation page, as indicated by the function block 144, the system calculates the protection based on the new value for the PS field in step 146. In step 148 the PowerPC page register tables are updated in step 148 with the new values for the protection attributes. Subsequently, the system flushes the PowerPC TLB entries in step 150 and returns to step 144 for processing another instruction or operand page register.

Power PC interrupts are handled by a Power PC Interrupt Service Routine 70. These interrupts are passed to the software emulator and in particular an Interrupts 1750A object 71. Interrupt handling does not form a part of the present invention.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A memory system comprising:
   one or more logical page registers, at least one of said logical page register configured to map 64K bytes of logical address space to sixteen (16) 4K word logical pages on 4K word boundaries; and
   means for mapping each of said 4K word logical pages to four (4) 4K byte physical address pages, wherein each word in logical address space is mapped to 4 bytes in said physical address space; wherein said mapping means implemented in hardware.

2. The memory system as recited in claim 1, further including means for providing one or more protection attributes for said memory.

3. The memory system as recited in claim 2, wherein said protection attribute is block protection of 1K word blocks of physical memory space.

4. The memory system as recited in claim 2, wherein said protection attribute is access lock and key.

5. The memory system as recited in claim 1, wherein said mapping means includes a microprocessor conforming to the Power PC architecture.

6. A method for mapping logical address space to physical memory space, the method comprising the steps of:
   (a) providing one or more logical page registers configured to map 64K words of logical address space to sixteen (16) 4K word logical pages on 4K word logical pages on 4K word boundaries; and
   (b) mapping each of said 4K word logical pages to four (4) 4K byte physical address pages, wherein each word in logical address space is mapped to 4 bytes in said address pages.

7. The method as recited in claim 6, further including the step of providing one or more protection attributes for said memory.

8. The method as recited in claim 7, wherein said protection attribute is block protection of 1K word blocks in logical memory space.

9. The method as recited in claim 7, wherein said protection attribute is access lock and key.

10. The method as recited in claim 6, wherein said mapping is done in hardware.

11. The method as recited in claim 10, wherein said hardware in a Power PC microprocessor.

* * * * *